(12) United States Patent
Aoyama et al.

(10) Patent No.: US 10,571,021 B2
(45) Date of Patent: Feb. 25, 2020

(54) CONTROL DEVICE OF VEHICLE POWER TRANSMISSION DEVICE

(71) Applicant: TOYOTA JIDOSHA KABUSHIKI KAISHA, Toyota-shi, Aichi (JP)

(72) Inventors: Junichi Aoyama, Toyota (JP);
Masayuki Tsujita, Okazaki (JP);
Tsutomu Kawanishi, Nisshin (JP);
Taichi Washio, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/182,777

(22) Filed: Nov. 7, 2018

(65) Prior Publication Data

US 2019/0145515 A1   May 16, 2019

(30) Foreign Application Priority Data

Nov. 13, 2017   (JP) .................................. 2017-218593

(51) Int. Cl.
| | |
|---|---|
| *F16H 9/18* | (2006.01) |
| *F16H 61/662* | (2006.01) |
| *B60K 17/344* | (2006.01) |
| *F16H 37/06* | (2006.01) |
| *F16H 59/50* | (2006.01) |

(Continued)

(52) U.S. Cl.
CPC ..... *F16H 61/66272* (2013.01); *B60K 17/344* (2013.01); *F16H 9/18* (2013.01); *F16H 37/06* (2013.01); *F16H 37/022* (2013.01); *F16H 59/46* (2013.01); *F16H 59/50* (2013.01);

(Continued)

(58) Field of Classification Search
CPC ...... F16H 61/66272; F16H 37/06; F16H 9/18; F16H 37/022; F16H 2059/704; F16H 2059/465; F16H 59/46; F16H 2059/506; F16H 59/50; B60K 17/344; B60K 23/0808; B60K 17/3515; B60K 17/35;
(Continued)

(56) References Cited

U.S. PATENT DOCUMENTS

2016/0334010 A1* 11/2016 Nitani .................. F16H 61/04
2017/0015195 A1    1/2017 Yoshimura
2017/0254412 A1*  9/2017 Inoue ...................... F16H 9/18

FOREIGN PATENT DOCUMENTS

| JP | 2005-042828 A | 2/2005 |
|---|---|---|
| JP | 2006-088907 A | 4/2006 |

(Continued)

*Primary Examiner* — David J Hlavka
(74) *Attorney, Agent, or Firm* — Oliff PLC

(57) ABSTRACT

In a control device of a vehicle power transmission device, a first meshing clutch has a drive power source side meshing member coupled to a power transmission member, an auxiliary drive wheel side meshing member coupled to the power transmission member, and an actuator engaging or releasing the drive power source side meshing member and the auxiliary drive wheel side meshing member, and when a rotation speed difference between a rotation speed of the drive power source side meshing member and a rotation speed of the auxiliary drive wheel side meshing member is larger than a predefined value at the time when a first meshing clutch is brought into an engaged state, a clamping pressure on a transmission belt is increased as compared to when a rotation speed difference is equal to or less than a predefined value.

6 Claims, 6 Drawing Sheets

(51) Int. Cl.
    *F16H 59/46*     (2006.01)
    *F16H 59/70*     (2006.01)
    *F16H 37/02*     (2006.01)

(52) U.S. Cl.
    CPC .. *F16H 2059/465* (2013.01); *F16H 2059/506* (2013.01); *F16H 2059/704* (2013.01)

(58) Field of Classification Search
    CPC ................. B60K 17/342; B60K 17/34; B60K 2023/0858; B60K 2023/0816
    See application file for complete search history.

(56) References Cited

FOREIGN PATENT DOCUMENTS

| | | |
|---|---|---|
| JP | 2015-193368 A | 11/2015 |
| JP | 2017-125517 A | 7/2017 |

\* cited by examiner

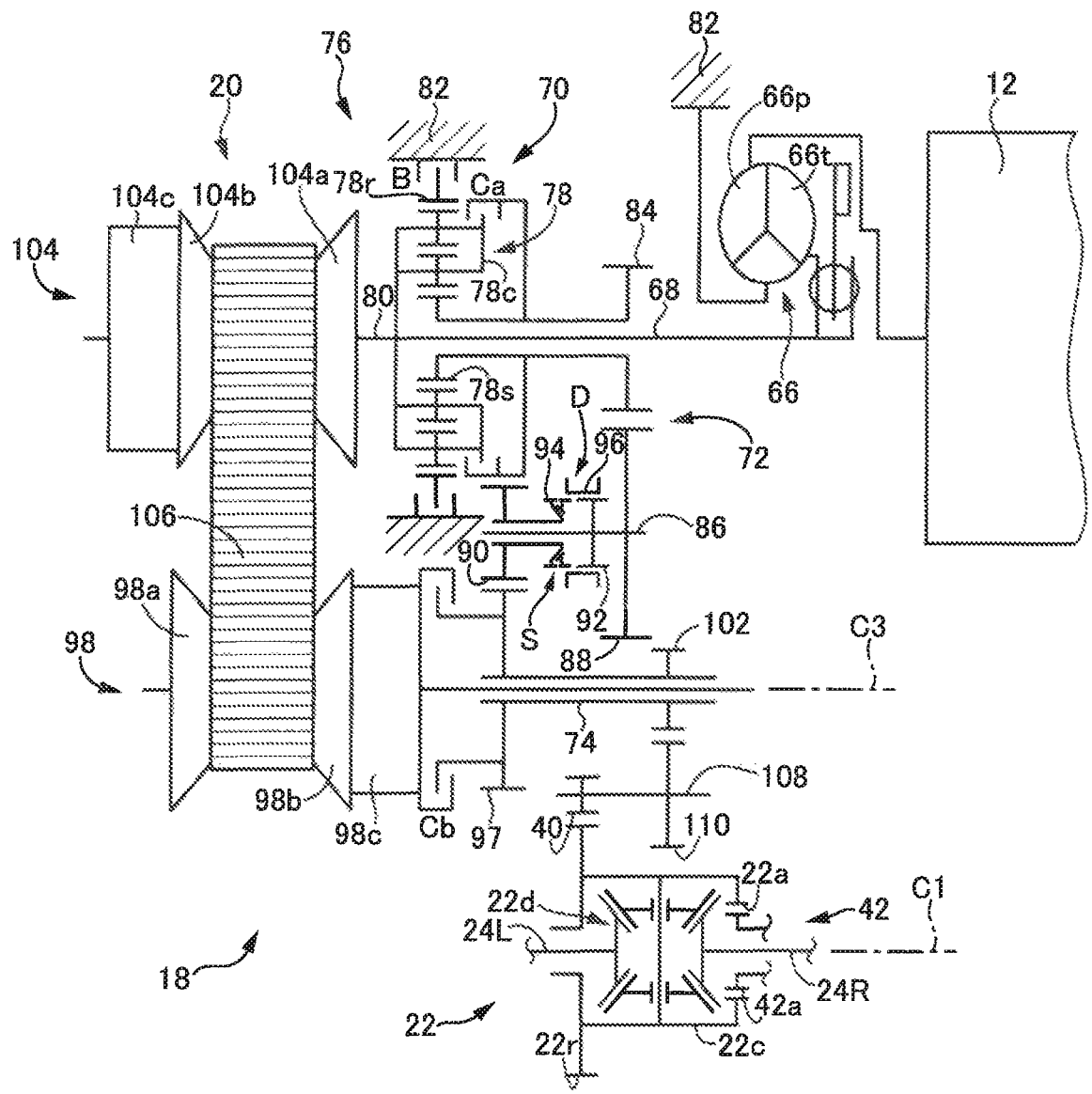

CONTROL DEVICE OF VEHICLE POWER TRANSMISSION DEVICE

This application claims priority from Japanese Patent Application No, 2017-218593 filed on Nov. 13, 2017, the disclosure of which is herein incorporated by reference in its entirety.

BACKGROUND OF THE INVENTION

Field of the Invention

The present invention relates to a technique, in a vehicle power transmission device including a first meshing clutch disposed in a power transmission path transmitting to a pair of auxiliary drive wheels a portion of a drive power output from a drive power source through a belt-type continuously variable transmission to a pair of main drive wheels, for properly suppressing a belt slip of the belt-type continuously variable transmission caused by an engagement shock when the first meshing clutch is engaged.

Description of the Related Art

There is known a vehicle power transmission device including (a) a continuously variable transmission and (b) a first meshing clutch disposed in a power transmission path transmitting to a pair of auxiliary drive wheels a portion of a drive power output from a drive power source through the continuously variable transmission to a pair of main drive wheels and (c) switching a vehicle between a two-wheel driving and a four-wheel driving by engaging or releasing the first meshing clutch. For example, this corresponds to a vehicle power transmission device described in Patent Document 1. In the vehicle power transmission device disclosed in Patent Document 1, the first meshing clutch has a drive power source side meshing gear coupled to a power transmission member on the drive power source side of the power transmission path and an auxiliary drive wheel side meshing gear coupled to a power transmission member on the auxiliary drive wheel side of the power transmission path, and an actuator engaging or releasing the drive power source side meshing gear and the auxiliary drive wheel side meshing gear. An example of the continuously variable transmission is a belt-type continuously variable transmission having a pair of pulleys and a transmission belt wound between the paired pulleys, as disclosed in Patent Document 2, for example.

CITATION LIST

Patent Document 1: Japanese Laid-Open Patent Publication No. 2015-193368
Patent Document 2: Japanese Laid-Open Patent Publication No. 2005-42828

SUMMARY OF THE INVENTION

Technical Problem

In a vehicle power transmission device as described in Patent Document 1, if the drive power source side meshing gear and the auxiliary drive wheel side meshing gear are engaged while a rotation speed difference is relatively large between the drive power source side meshing gear and the auxiliary drive wheel side meshing gear in the first meshing clutch due to, for example, a slip of the main drive wheel, at the time of switching from the two-wheel driving to the four-wheel driving during running by the two-wheel driving with the first meshing clutch released, a slip of the transmission belt may occur due to an engagement shock in the first meshing clutch, i.e., a sudden inertia torque from the auxiliary drive wheel side, input to the belt-type continuously variable transmission.

The present invention was conceived in view of the situations and it is therefore an object of the present invention to provide a control device of a vehicle power transmission device configured to properly suppress a belt slip of a belt-type continuously variable transmission caused by an engagement shock of a first meshing clutch.

Solution to Problem

To achieve the above object, a first aspect of the present invention provides a control device of a vehicle power transmission device, (a) the vehicle power transmission device including a belt-type continuously variable transmission having a pair of pulleys, a transmission belt wound between the pair of pulleys, and a first meshing clutch disposed in a power transmission path transmitting to a pair of auxiliary drive wheels a portion of a drive power output from a drive power source via the belt-type continuously variable transmission to a pair of main drive wheels, the control device switching a two-wheel driving and a four-wheel driving by engaging or releasing the first meshing clutch, wherein (b) the first meshing clutch has a drive power source side meshing member coupled to a power transmission member on the drive power source side of the power transmitting path, an auxiliary drive wheel side meshing member coupled to a power transmission member on the auxiliary drive wheel side of the power transmitting path, and an actuator engaging or releasing the drive power source side meshing member and the auxiliary drive wheel side meshing member, and wherein (c) when a rotation speed difference between a rotation speed of the drive power source side meshing member and a rotation speed of the auxiliary drive wheel side meshing member is larger than a predefined value at the time when the first meshing clutch is brought into an engaged state, a clamping pressure on the transmission belt is increased as compared to when the rotation speed difference is equal to or less than the predefined value.

A second aspect of the present invention provides the control device of a vehicle power transmission device recited in the first aspect of the invention, wherein the control device determines whether the rotation speed difference is larger than the predefined value based on whether a wheel speed difference between an average wheel speed of the pair of main drive wheels and an average wheel speed of the pair of auxiliary drive wheels is larger than a predefined wheel speed difference.

A third aspect of the present invention provides the control device of a vehicle power transmission device recited in the first or second aspect of the invention, wherein for the clamping pressure on the transmission belt increased when the rotation speed difference is larger than the predefined value, an increase amount is set to be larger when a transmission ratio of the belt-type continuously variable transmission at the time of engagement of the first meshing clutch is small than when the transmission ratio is large.

A fourth aspect of the present invention provides the control device of a vehicle power transmission device recited in any one of the first to third aspects of the invention, wherein (a) the belt-type continuously variable transmission is disposed in a power transmission path between an input shaft to which the drive power output from the drive power source is transmitted and an output shaft outputting the drive power to the pair of main drive wheels, wherein the power transmission device includes (b) a gear transmission mechanism disposed in the power transmission path between the input shaft and the output shaft parallel to the belt-type continuously variable transmission and (c) a clutch mechanism alternatively switching between a first transmission path in which a drive power input to the input shaft is transmitted to the output shaft via the belt-type continuously variable transmission and a second transmission path in which a drive power input to the input shaft is transmitted to the output shaft via the gear transmission mechanism, and wherein (d) when the first transmission path is selected by the clutch mechanism and the rotation speed difference is larger than the predefined value at the time when the first meshing clutch is brought into the engaged state, the clamping pressure on the transmission belt is increased.

A fifth aspect of the present invention provides the control device of a vehicle power transmission device recited in the fourth aspect of the invention, wherein when the second transmission path is selected by the clutch mechanism and the rotation speed difference is larger than the predefined value at the time when the first meshing clutch is brought into the engaged state, the clamping pressure on the transmission belt is increased.

A sixth aspect of the present invention provides the control device of a vehicle power transmission device recited in any one of the first to fifth aspects of the invention, (a) wherein a propeller shaft and a second meshing clutch are arranged in series between the first meshing clutch and the auxiliary drive wheels in the power transmission path in which a portion of the drive power output from the drive power source via the belt-type continuously variable transmission for the pair of main drive wheels is transmitted to the pair of auxiliary drive wheels, wherein (b) both the first meshing clutch and the second meshing clutch are released in the two-wheel driving, and wherein (c) in the case of switching from the two-wheel driving to the four-wheel driving, the first meshing clutch is engaged after the second meshing clutch is engaged.

Advantageous Effects of Invention

According to the control device of the vehicle power transmission device recited in the first aspect of the invention, when the rotation speed difference between the rotation speed of the drive power source side meshing member and the rotation speed of the auxiliary drive wheel side meshing member is larger than the predefined value at the time when the first meshing clutch is brought into the engaged state, the clamping pressure on the transmission belt wound around the pair of pulleys of the belt-type continuously variable transmission is increased as compared to when the rotation speed difference is equal to or less than the predefined value. Therefore, if the rotation speed difference is larger than the predefined value so that the engagement shock is relatively large at the time of engagement of the first meshing clutch, the clamping pressure on the transmission belt is increased, and therefore, the belt slip can properly be suppressed even if the engagement shock at the first meshing clutch is transmitted to the belt-type continuously variable transmission.

According to the control device of the vehicle power transmission device recited in the second aspect of the invention, whether the rotation speed difference is larger than the predefined value is determined based on whether the wheel speed difference between the average wheel speed of the pair of main drive wheels and the average wheel speed of the pair of auxiliary drive wheels is larger than the predefined wheel speed difference. Therefore, from the rotation speeds of the pair of main drive wheels and the pair of auxiliary drive wheels, it can properly be determined that the rotation speed difference is larger than the predefined value.

According to the control device of the vehicle power transmission device recited in the third aspect of the invention, for the clamping pressure on the transmission belt increased when the rotation speed difference is larger than the predefined value, the increase amount is set to be larger as the transmission ratio of the belt-type continuously variable transmission becomes smaller when the first meshing clutch is engaged. Therefore, if the transmission ratio of the belt-type continuously variable transmission is relatively small so that the tension of the transmission belt becomes small with respect to the clamping pressure as compared to when the transmission ratio of the belt-type continuously variable transmission is relatively large, the increase amount for the clamping pressure is set to be large as compared to when the transmission ratio of the belt-type continuously variable transmission is relatively large. Therefore, the belt slip of the belt-type continuously variable transmission can properly be suppressed by the necessary and sufficient increase amount for the clamping pressure.

According to the control device of the vehicle power transmission device recited in the fourth aspect of the invention, (a) the belt-type continuously variable transmission is disposed in the power transmission path between the input shaft to which the drive power output from the drive power source is transmitted and the output shaft outputting the drive power to the pair of main drive wheels; the vehicle power transmission device includes (b) the gear transmission mechanism disposed in the power transmission path between the input shaft and the output shaft parallel to the belt-type continuously variable transmission and having at least one gear ratio and (c) the clutch mechanism alternatively switching the first transmission path transmitting the drive power to the input shaft via the belt-type continuously variable transmission to the output shaft and the second transmission path transmitting the drive power to the input shaft via the gear transmission mechanism to the output shaft; and (d) if the first transmission path is selected by the clutch mechanism and the rotation speed difference in the first meshing clutch is larger than the predefined value, the clamping pressure on the transmission belt is increased. Therefore, even in the vehicle power transmission device in which the belt-type continuously variable transmission and the gear transmission mechanism are disposed parallel to each other in the power transmission path between the input shaft and the output shaft, the belt slip of the belt-type continuously variable transmission can properly be suppressed.

According to the control device of the vehicle power transmission device recited in the fifth aspect of the invention, if the second transmission path is selected by the clutch mechanism and the rotation speed difference in the first meshing clutch is larger than the predefined value, the clamping pressure on the transmission belt is increased. Therefore, when the second transmission path is selected by the clutch mechanism, the belt slip of the belt-type continuously variable transmission can properly be suppressed even when the engagement shock at the first meshing clutch is transmitted via the second transmission path to an input-side member of the belt-type continuously variable transmission.

According to the control device of the vehicle power transmission device recited in the sixth aspect of the invention, (a) the propeller shaft and the second meshing clutch are arranged in series between the first meshing clutch and the auxiliary drive wheels in the power transmission path transmitting a portion of the drive power of the drive power source to the pair of auxiliary drive wheels; (b) both the first meshing clutch and the second meshing clutch are released in the two-wheel driving; and (c) in the case of switching from the two-wheel driving to the four-wheel driving, the first meshing clutch is engaged after the second meshing clutch is engaged. Therefore, even if the engagement shock of the first meshing clutch, i.e., the sudden inertia torque from the members on the side of the auxiliary drive wheels including the propeller shaft, is input to the belt-type continuously variable transmission, the belt slip of the belt-type continuously variable transmission can properly be suppressed.

BRIEF DESCRIPTION OF THE DRAWINGS

FIG. 2 is a diagram for explaining a configuration of a belt-type continuously variable transmission, a gear transmission mechanism, etc. disposed in the vehicle power transmission device of FIG. 1;

FIG. 3 is an engagement table of engagement elements for each of running patterns of the vehicle power transmission device of FIG. 1;

DESCRIPTION OF THE PREFERRED EMBODIMENTS

Examples of the present invention will now be described in detail with reference to the drawings.

First Example

Figure 1:
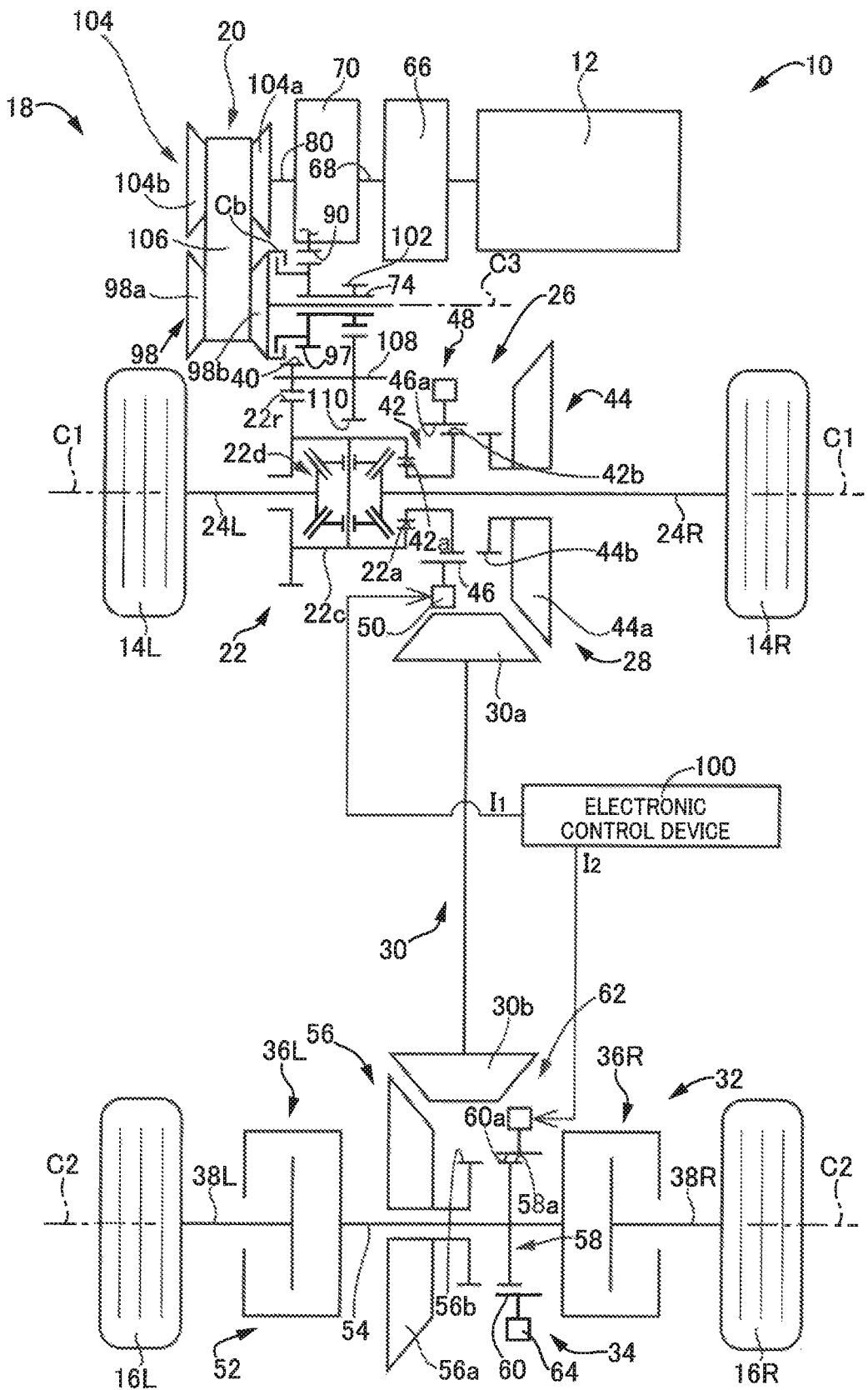
FIG. 1 is a skeleton diagram for schematically explaining a configuration of a four-wheel drive vehicle, i.e., a vehicle power transmission device, to which the present invention is preferably applied.

FIG. 1 is a skeleton diagram for schematically explaining a configuration of a four-wheel drive vehicle 10 to which the present invention is preferably applied. In FIG. 1, the four-wheel drive vehicle 10 includes an engine 12 used as a drive power source, and further includes an FF (front-engine front-wheel drive) type power transmission device (vehicle power transmission device) 18 having a first power transmission path transmitting a drive power of the engine 12 to left and right-front wheels 14L, 14R corresponding to a pair of main drive wheels and a second power transmission path transmitting a drive power of the engine 12 to left and right rear wheels 16L, 16R corresponding to a pair of auxiliary drive wheels. In a two-wheel driving of the four-wheel drive vehicle 10, the drive power transmitted from the engine 12 via a belt-type continuously variable transmission 20 is output through a front-wheel drive power distribution unit 22 and left and right axles 24L, 24R to the left and right front wheels 14L, 14R. In this two-wheel driving, at least a first meshing clutch 26 is released, and the drive power transmitted from the engine 12 via the belt-type continuously variable transmission 20 is not transmitted to a transfer 28, a propeller shaft 30, a rear-wheel drive power distribution unit 32, and the rear wheels 16L, 16R. However, in a four-wheel driving (4WD), both the first meshing clutch 26 and a second meshing clutch 34 are further engaged relative to the two-wheel driving, and a transmission torque to an axle 38L and the rear wheel 16L is controlled by a left electromagnetic coupling 36L, while a transmission torque to an axle 38R and the rear wheel 16R is controlled by a right electromagnetic coupling 36R.

As shown in FIGS. 1 and 2, the front-wheel drive power distribution unit 22 made up of a differential gear device is disposed rotatably around a first axis C1 and has a differential ring gear 22r meshed with a small-diameter gear 40 described later, a differential case 22c to which the differential ring gear 22r is fixed, a differential gear mechanism 22d housed in the differential case 22c, etc., and the front-wheel drive power distribution unit 22 transmits to the front wheels 14L, 14R the drive power output from the engine 12 to the left and right axles 24L, 24R of the front wheels 14L, 14R while allowing a differential rotation thereof. The differential case 22c is provided with inner circumferential meshing teeth 22a meshed with outer circumferential meshing teeth 42a formed on an end portion of a first rotating member (power transmission member) 42 disposed in the transfer 28. As a result, a portion of the drive power output from the engine 12 via the front-wheel drive power distribution unit 22 to the front wheels 14L, 14R is transmitted to the first rotating member 42 of the transfer 28.

As shown in FIG. 1, the transfer 28 includes the first rotating member 42 described above, a second rotating member 44 provided with a ring gear 44a meshed with a driven pinion 30a formed on an end portion of the propeller shaft 30 on the side of the front wheels 14L, 14R, and a first meshing clutch 26 that is a meshing-type dog clutch selectively disconnecting or connecting a power transmission path between the first rotating member 42 and the second rotating member 44. In the transfer 28, when the first meshing clutch 26 is engaged to connect the power transmission path between the first rotating member 42 and the second rotating member 44, a portion of the drive power output from the engine 12 to the front wheels 14L, 14R is distributed to the rear wheels 16L, 16R, i.e., the propeller shaft 30.

As shown in FIG. 1, the first rotating member 42 is a cylindrical member penetrated by the axle 24R on the inner circumferential side thereof, and the first rotating member 42 is supported rotatably around the first axis C1 by the differential ease 22c and a case (not shown) of the transfer 28. The outer circumferential meshing teeth 42a described above are formed on an end portion of the first rotating member 42, which is the cylindrical member, on the front wheel 14L side, and first clutch teeth (a drive power source side meshing member) 42b constantly meshed with inner circumferential teeth 46a of a cylindrical first movable sleeve 46 disposed on the first meshing clutch 26 are formed on an end portion of the first rotating member 42 on the side opposite to the front wheel 14L side.

As shown in FIG. 1, the second rotating member 44 is a cylindrical member penetrated by the axle 24R on the inner circumferential side thereof and is supported by a case not shown disposed rotatably around the first axis C1 on the transfer 28. The ring gear 44a described above is formed on an end portion of the second rotating member 44, which is the cylindrical member, on the front wheel 14R side, and second clutch teeth (an auxiliary drive wheel side meshing member) 44b meshed with the inner circumferential teeth 46a of the first movable sleeve 46 are formed on an end portion of the second rotating member 44 on the side opposite to the front wheel 14R side.

As shown in FIG. 1, the first meshing clutch 26 is disposed in a power transmission path transmitting to the rear wheels 16L, 16R, i.e., the propeller shall 30, a portion of the drive power output from the engine 12 via the belt-type continuously variable transmission 20 to the front wheels 14L, 14R, and the first meshing clutch 26 includes: the first clutch teeth 42b formed integrally with, i.e., coupled to, a power transmission member, i.e., the first rotating member 42, of the power transmission path on the side of the engine 12 relative to the first meshing clutch 26; the second clutch teeth 44b formed integrally with, i.e., coupled to, a power transmission member, i.e., the second rotating member 44, of the power transmission path on the side of the rear wheels 16L, 16R relative to the first meshing clutch 26; and a first actuator (actuator) 48 engaging or releasing the first clutch teeth 42b and the second clutch teeth 44b.

As shown in FIG. 1, the first actuator 48 includes the first movable sleeve 46 provided with the inner circumferential teeth 46a which are constantly meshed with the first clutch teeth 42b and capable of meshing with the second clutch teeth 44b while the first movable sleeve 46 is relatively movable in the first axis C1 direction, and a first sleeve drive device 50 moving the first movable sleeve 46 in the first axis C1 direction between a first meshing position where the inner circumferential teeth 46a of the sleeve 46 is meshed with the second clutch teeth 44b and a first non-meshing position where the inner circumferential teeth 46a of the sleeve 46 is not meshed with the second clutch teeth 44b by a first drive current $I_1$ supplied from an electronic control device 100. FIG. 1 shows a state in which the first movable sleeve 46 is moved by the first sleeve drive device 50 to the first non-meshing position so that the first meshing clutch 26 is released.

As shown in FIG. 1, the rear-wheel drive power distribution unit 32 includes a differential mechanism 52 coupled via the axles 38L, 38R to the rear wheels 16L, 16R and transmitting to the rear wheels 16L, 16R the drive power distributed from the transfer 28 to the left and right axles 38L, 38R while allowing a differential rotation thereof, and the second meshing clutch 34 that is a meshing-type dog clutch selectively disconnecting or connecting a power transmission path between the differential mechanism 52 and the propeller shaft 30. As shown in FIG. 1, the propeller shaft 30 and the second meshing clutch 34 are arranged in series between the first meshing clutch 26 and the rear wheels 16L, 16R, i.e., between the first meshing clutch 26 and the differential mechanism 52, in the power transmission path transmitting to the rear wheels 16L, 16R a portion of the drive power output from the engine 12 via the belt-type continuously variable transmission 20 to the front wheels 14L, 14R.

As shown in FIG. 1, the differential mechanism 52 has the left electromagnetic coupling 36L adjusting the drive power transmitted to the rear wheel 16L corresponding to the left wheel of the rear wheels 16L, 16R, the right electromagnetic coupling 36R adjusting the drive power transmitted to the rear wheel 16R corresponding to the right wheel of the rear wheels 16L, 16R, and a central axle 54 having the left electromagnetic coupling 36L and the right electromagnetic coupling 36R coupled to both end portions. Although not shown, the left electromagnetic coupling 36L and the right electromagnetic coupling 36R each include an electrically controllable actuator including an electromagnetic coil and a ball cam and a wet multiplate clutch having a frictional force adjusted by the actuator, and the drive power transmitted to the rear wheels 16L, 16R is adjusted by a magnetic force generated by energizing the electromagnetic coil.

As shown in FIG. 1, the rear-wheel drive power distribution unit 32 includes a first rotating member 56 disposed rotatably around a second axis C2, and a second rotating member 58 integrally fixed to the central axle 54 of the differential mechanism 52 rotatably around the second axis C2. As shown in FIG. 1, the second meshing clutch 34 is the meshing-type dog clutch selectively disconnecting or connecting the power transmission path between the differential mechanism 52 and the propeller shaft 30 described above, i.e., the power transmission between the first rotating member 56 and the second rotating member 58. The first rotating member 56 is a cylindrical member penetrated by the central axle 54 on the inner circumferential side thereof, and a ring gear 56a meshed with a drive pinion 30b formed on an end portion of the propeller shaft 30 on the side of the rear wheels 16L, 16R is formed on an end portion of the first rotating member 56, which is the cylindrical member, on the rear wheel 16L side, while first clutch teeth 56b capable of meshing with inner circumferential teeth 60a of a cylindrical second movable sleeve 60 disposed on the second meshing clutch 34 are formed on an end portion of the first rotating member 56 on the side opposite to the rear wheel 16L side. The second rotating member 58 is a disk member integrally fixed to the central axle 54, and second clutch teeth 58a constantly meshed with the inner circumferential teeth 60a of the second movable sleeve 60 are formed on an outer circumferential portion of the second rotating member 58, which is the disk member.

As shown in FIG. 1, the second meshing clutch 34 has the first clutch teeth 56b formed integrally with the first rotating member 56, the second clutch teeth 58a formed integrally with the second rotating member 58, and a second actuator 62 engaging or releasing the first clutch teeth 56b and the second clutch teeth 58a.

As shown in FIG. 1, the second actuator 62 includes the second movable sleeve 60 provided with the inner circumferential teeth 60a which are constantly meshed with the second clutch teeth 58a and capable of meshing with the first clutch teeth 56b while the second movable sleeve 60 is relatively movable in the second axis C2 direction, and a second sleeve drive device 64 moving the second movable sleeve 60 in the second axis C2 direction between a second meshing position where the inner circumferential teeth 60a of the sleeve 60 is meshed with the first clutch teeth 56b and a second non-meshing position where the inner circumferential teeth 60a of the sleeve 60 is not meshed with the first clutch teeth 56b by a second drive current $I_2$ supplied from the electronic control device 100. Although not shown, the second meshing clutch 34 includes a synchronizing mechanism reducing a relative rotational difference between the first rotating member 56 and the second rotating member 58 when the second movable sleeve 60 moves from the second non-meshing position toward the second meshing position so that the inner circumferential teeth 60*a* of the second movable sleeve 60 are meshed with the first clutch teeth 56*b*. FIG. 1 shows a state in which the second movable sleeve 60 is moved by the second sleeve drive device 64 to the second non-meshing position so that the second meshing clutch 34 is released.

As described above, in the power transmission device 18 including the belt-type continuously variable transmission 20, the first meshing clutch 26, the second meshing clutch 34. etc., for example, when a four-wheel drive mode is selected in the electronic control device (control device) 100 described later, the first meshing clutch 26, the second meshing clutch 34, the left electromagnetic coupling 36L and the right electromagnetic coupling 36R are respectively engaged for executing the four-wheel driving in which the drive power is transmitted from the engine 12 via the belt-type continuously variable transmission 20 to the left and right front wheels 14L, 14R and the left and right rear wheels 16L, 16R. For example, when a two-wheel drive mode is selected in the electronic control device 100, the first meshing clutch 26, the second meshing clutch 34, the left electromagnetic coupling 36L, and the right electromagnetic coupling 36R are respectively released for executing the two-wheel driving in which the drive power is transmitted from the engine 12 via the belt-type continuously variable transmission 20 to the left and right front wheels 14L, 14R. In the two-wheel driving, the first meshing clutch 26, the second meshing clutch 34, the left electromagnetic coupling 36L, and the right electromagnetic coupling 36R are respectively released, so that the propeller shaft 30 is disconnected from the left and right front wheels 14L, 14R and the left and right rear wheels 16L and 16R i.e., a disconnected state is achieved. In the four-wheel driving, the first meshing clutch 26, the second meshing clutch 34, the left electromagnetic coupling 36L, and the right electromagnetic coupling 36R are respectively engaged, so that the propeller shaft 30 is connected to the left and right front wheels 14L, 14R and the left and right rear wheels 16L, 16R i.e., a connected state is achieved.

As shown in FIGS. 1 and 2, the power transmission device 18 further includes a torque converter 66 as a fluid transmission device, a turbine shaft (input shaft) 68 to which the drive power output from the engine 12 via the torque converter 66 is transmitted, a forward/reverse switching device 70, a gear transmission mechanism 72, and an output shaft 74 outputting a drive power to the front wheels 14L, 14R. In the power transmission device 18, the belt-type continuously variable transmission 20 is disposed in a power transmission path between the turbine shaft 68 and the output shaft 74, and the gear transmission mechanism 72 is disposed in the power transmission path between the turbine shaft 68 and the output shaft 74 and parallel to the belt-type continuously variable transmission 20. As a result, the power transmission device 18 is provided with a first transmission path transmitting the drive power, which is generated by the engine 12 and transmitted to the turbine shaft 68, via the belt-type continuously variable transmission 20 to the output shaft 74 and a second transmission path transmitting the drive power, which is generated by the engine 12 and transmitted to the turbine shaft 68, via the gear transmission mechanism 72 to the output shaft 74, and the first transmission path and the second transmission path can alternatively be switched by a clutch mechanism 76 described later.

As shown in FIG. 2, the torque converter 66 includes a pump impeller 66*p* coupled to a crankshaft of the engine 12, and a turbine impeller 66*t* coupled to the forward/reverse switching device 70 via the turbine shaft 68 corresponding to an output-side member of the torque converter 66 and transmits the drive power through a fluid.

The forward/reverse switching device 70 includes a forward clutch Ca and a reverse brake B as well as a double pinion type planetary gear device 78 with a carrier 78*c* integrally coupled to the turbine shaft 68 of the torque converter 66 and an input shaft 80 of the belt-type continuously variable transmission 20, a ring gear 78*r* selectively coupled via the reverse brake B to a housing 82 serving as a non-rotating member, and a sun gear 78*s* coupled to a small-diameter gear 84. The sun gear 78*s* and the carrier 78*c* are selectively coupled via the forward clutch Ca. Both the forward clutch Ca and the reverse brake B are hydraulic friction engagement devices frictionally engaged by hydraulic actuators.

As shown in FIG. 2, the gear transmission mechanism 72 includes the small-diameter gear 84 described above and a large-diameter gear 88 relatively non-rotatably disposed on a first countershaft 86 and has one gear ratio. An idler gear 90 is disposed relatively rotatably with respect to the first countershaft 86 around the same rotation axis as the first countershaft 86. In a power transmission path between the first countershaft 86 and the idler gear 90, a meshing clutch D is disposed to selectively disconnect or connect the power transmission path. The meshing clutch D includes a first gear 92 formed on the first countershaft 86, a second gear 94 formed on the idler gear 90, and a hub sleeve 96 provided with spline teeth that can be fitted to (engaged with, meshed with) the first gear 92 and the second gear 94, and the power transmission path between the first countershaft 86 and the idler gear 90 is connected by fitting the hub sleeve 96 to the first gear 92 and the second gear 94. The meshing clutch D further includes a synchromesh mechanism S as a synchronizing mechanism synchronizing the rotation of the first gear 92 and the second gear 94 at the time of engaging to the first gear 92 and the second gear 94.

As shown in FIG. 2, the idler gear 90 is meshed with an input gear 97 having a larger diameter than the idler gear 90. The input gear 97 is disposed relatively non-rotatably With respect to the output shaft 74 arranged on a third axis C3 coincident with a rotation axis of a secondary pulley (pulley) 98 described later of the belt-type continuously variable transmission 20. The output shaft 74 is arranged rotatably around the third axis C3 and has the input gear 97 and an output gear 102 disposed thereon relatively non-rotatably. The forward clutch Ca, the reverse brake B, and the meshing clutch D are interposed in the second transmission path transmitting the torque of the engine 12 from the turbine shaft 68 via the gear transmission mechanism 72 to the output shaft 74.

As shown in FIG. 2, the belt-type continuously variable transmission 20 is disposed in a torque transmission path between the turbine shaft 68 functioning as an input shaft and the output shaft 74. The belt-type continuously variable transmission 20 includes a primary pulley (pulley) 104 serving as an input-side member and coupled to the turbine shaft 68 via the input shaft 80, the secondary pulley 98 serving as an output-side member and coupled to the output shaft 74 via a belt running clutch Cb described later, and a transmission belt 106 wound between the paired primary and secondary pulleys 104, 98. An effective diameter of each of the primary and secondary pulleys 104, 98 is variable. The belt-type continuously variable transmission 20 transmits the drive power using frictional force between each of the pair of the primary and secondary pulleys 104, 98 and the transmission belt 106.

As shown in FIG. 2, the primary pulley 104 includes a fixed sheave 104a as an input-side fixed rotating body fixed to the input shaft 80, a movable sheave 104b as an input-side movable rotating body disposed relatively non-rotatably around the input shaft 80 with respect to the input shaft 80 and movably in the direction of the input shaft 80, and a primary-side hydraulic actuator 104c generating a thrust force for moving the movable sheave 104b to change a V-groove width therebetween. The secondary pulley 98 includes a fixed sheave 98a as an output-side fixed rotating body, a movable sheave 98b as an output-side movable rotating body disposed relatively non-rotatably around the third axis C3 with respect to the fixed sheave 98a and movably in the third axis C3 direction, and a secondary-side hydraulic actuator 98c generating a thrust force for moving the movable sheave 98b to change a V-groove width therebetween.

An actual transmission ratio (gear ratio) γ (=primary rotation speed Nin/secondary rotation speed Nout) is continuously changed by changing the respective groove width of the V-groove of each of the pair of the primary and secondary pulleys 104, 98 to vary a winding diameter (the effective diameter) of the transmission belt 106. For example, when the V groove width of the primary pulley 104 is narrowed, the transmission ratio γ is reduced. Therefore, the belt-type continuously variable transmission 20 is upshifted. When the V-groove width of the primary pulley 104 is widened, the transmission ratio γ is increased. Therefore, the belt-type continuously variable transmission 20 is downshifted.

As shown in FIG. 2, the power transmission path between the belt-type continuously variable transmission 20 and the output shaft 74 has the belt running clutch Cb interposed therein for selectively disconnecting or connecting the power transmission path, and when the belt running clutch Cb is engaged, the first transmission path transmitting the drive power of the engine 12 via the turbine shaft 68 and the belt-type continuously variable transmission 20 to the output shaft 74 is formed in the power transmission device 18. When the belt running clutch Cb is released, the first transmission path is disconnected, and the drive power is not transmitted via the belt-type continuously variable transmission 20 to the output shaft 74.

As shown in FIG. 2, the output gear 102 is meshed with a large-diameter gear 110 fixed to a second countershaft 108. The second countershaft 108 is provided with the large-diameter gear 110 and the small-diameter gear 40 which is meshed with the differential ring gear 22r of the front-wheel drive power distribution unit 22.

An operation of the power transmission device 18 configured as described above will be described with an engagement table in FIG. 3 in which engagement statuses of engagement elements are shown for each of running patterns of the vehicle 10. Each column Ca in FIG. 3 denotes the operation state of the forward clutch Ca, each column Cb in FIG. 3 denotes the operation state of the belt running clutch Cb, each column B in FIG. 3 denotes the operation state of the reverse brake B, each column D in FIG. 3 denotes the operation state of the dog clutch D, "O" indicative of engagement, and "x" indicative of release. The meshing clutch D includes the synchronizing mechanism S, and when the meshing clutch D is engaged, the synchronizing mechanism S substantially operates. The clutch mechanism 76 includes the forward clutch Ca, the belt running clutch Cb, the reverse brake B, and the meshing clutch D.

Description will first be made of one of the running patterns in which the drive power, which is generated by the engine 12 and input to the turbine shaft 68, is transmitted to the output shaft 74 via the belt-type continuously variable transmission 20. This running pattern corresponds to belt running (high vehicle speed) of FIG. 3, and as shown in FIG. 3, in the belt running, the belt running clutch Cb is engaged while the forward clutch Ca, the reverse brake B, and the meshing clutch D are released. Since the belt running clutch Cb is engaged, the secondary pulley 98 and the output shaft 74 are connected, so that the secondary pulley 98, the output shaft 74, and the output gear 102 are integrally rotated. Therefore, when the belt running clutch Cb is engaged, the first transmission path is formed, and the drive power of the engine 12 is transmitted via the torque converter 66, the turbine shaft 68, the input shaft 80, and the belt-type continuously variable transmission 20 to the output shaft 74 and the output gear 102. The drive power transmitted to the output gear 102 is transmitted via the large-diameter gear 110, the small-diameter gear 40, and the differential gear 22r to the left and right front wheels 14L, 14R.

Description will be made of a running pattern of transmitting the drive power, which is generated by the engine 12 and transmitted to the turbine shaft 68, via the gear transmission mechanism 72 to the output shaft 74, i.e., a running pattern of transmitting the drive power of the engine 12 through the second transmission path. This running pattern corresponds to gear running of FIG. 3, and as shown in FIG. 3, in the gear running, the forward clutch Ca and the meshing clutch D are engaged while the belt running clutch Cb and the reverse brake B are released.

Since the forward clutch Ca is engaged, the gears of the planetary gear device 78 constituting the forward/reverse switching device 70 are integrally rotated, so that the small-diameter gear 84 is rotated at the same rotation speed as the turbine shaft 68. Since the meshing clutch D is engaged, the power transmission path between the first countershaft 86 and the idler gear 90 is connected, and the first countershaft 86 and the idler ear 90 are integrally rotated. Therefore, by engaging the forward clutch Ca and the meshing clutch D, the second transmission path is formed, and the drive power of the engine 12 is transmitted via the torque converter 66, the turbine shaft 68, the forward/reverse switching device 70, the gear transmission mechanism 72, the idler gear 90, and the input gear 97 to the output shaft 74 and the output gear 102.

The gear running is selected in a low vehicle speed region. A gear ratio EL (a rotation speed of the turbine shaft 68/a rotation speed of the output shaft 74) during the second transmission path is selected is set to a value larger than a maximum transmission ratio max of the belt-type continuously variable transmission 20. Therefore, the gear ratio EL is set to a value that is not set in the belt-type continuously variable transmission 20. For example, when a vehicle speed V is increased and enters a predefined belt running region for performing the belt running, switching to the gear running is achieved. When switching is performed from the gear running to the belt running (high vehicle speed) or from the belt running (high vehicle speed) to the gear running, the switching is performed transiently through a belt running (medium vehicle speed) mode shown in FIG. 3.

For example, when switching is performed from the gear running mode to the belt running (high vehicle speed) mode, switching is transiently performed from a state corresponding to the gear running mode in which the forward clutch Ca and the dog clutch D are engaged, to a state in which the belt running clutch Cb and the dog clutch D are engaged. Specifically, a shift by changing operation states of the clutches (e.g., a clutch-to-clutch shifting) is executed such that the forward clutch Ca is released while the belt running clutch Cb is engaged. In this case, the power transmission path between the turbine shaft 68 and the output shaft 74 is changed from the second transmission path to the first transmission path, and the power transmission device 18 is substantially upshifted. After the power transmission path is switched to the second transmission path, the dog clutch D is released to prevent unnecessary dragging and high rotation of the gear transmission mechanism 72.

If switching is performed from the belt running (high vehicle speed) mode to the gear running mode, switching is transiently performed from a state in which the belt miming clutch Cb is engaged, to a state in which the dog clutch D is further engaged, for preparation of switching to the gear running mode. In this case, rotation is also transmitted to the sun gear 78s of the planetary gear device 78 via the gear transmission mechanism 72. When a clutch-to-clutch shifting is executed, i.e., the forward clutch Ca is engaged and the belt running clutch Cb is released, the power transmission path between the turbine shaft 68 and the output shaft 74 in the power transmission device 18 is switched from the first transmission path to the second transmission path. In this case, the power transmission device 18 is substantially downshifted.

Figure 4:
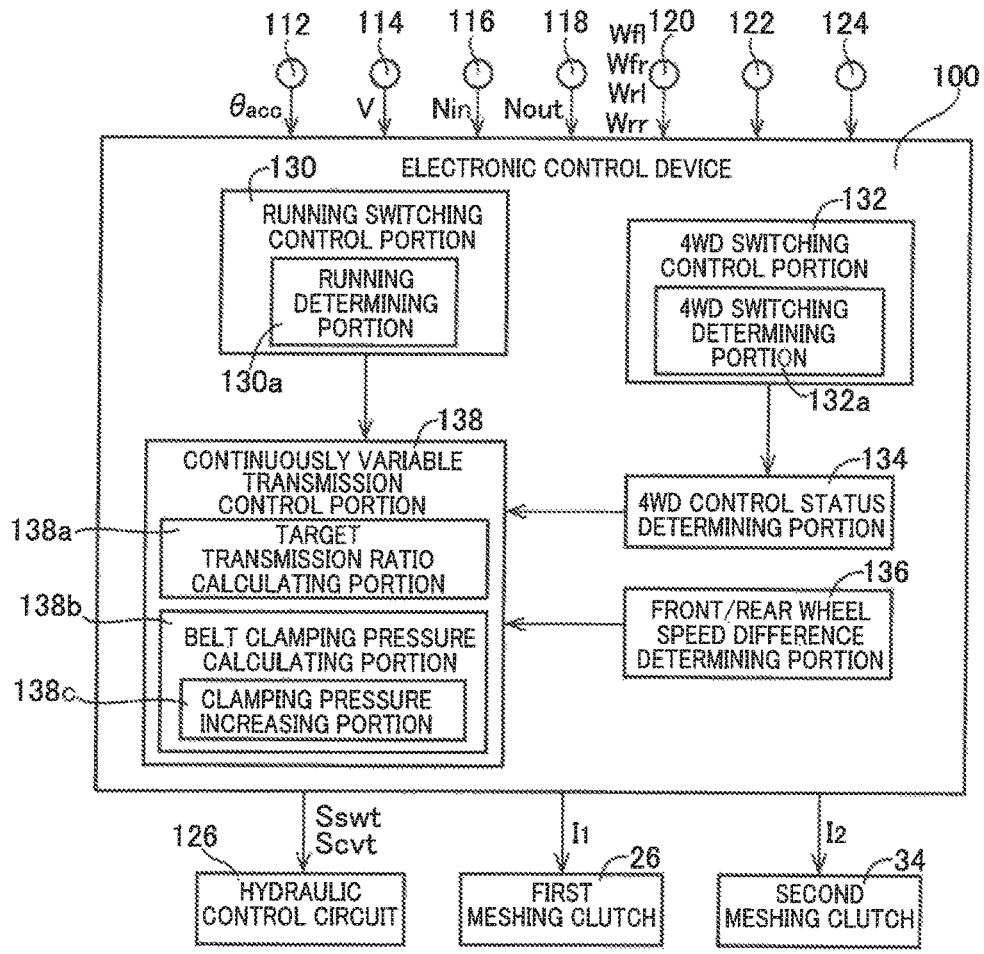
FIG. 4 is a functional block diagram for explaining a main portion of a control function included in an electronic control device of the vehicle power transmission device of FIG. 1.

FIG. 4 is a functional block diagram for explaining an input/output system of the electronic control device 100 disposed for controlling the belt-type continuously variable transmission 20, the first meshing clutch 26, the second meshing clutch 34, etc. and for explaining a main portion of a control function according to the electronic control device 100. The electronic control device 100 is configured to include, for example, a so-called microcomputer including a CPU, a RAM, a ROM, an I/O interface, etc., and the CPU executes a signal process according to a program stored in advance in the ROM, while utilizing a temporary storage function of the RAM to provide various controls of the power transmission device 18. For example, the electronic control device 100 provides a shift control and a belt clamping pressure control of the belt-type continuously variable transmission 20, a control of appropriately switching the drive power transmission path of the power transmission device 18 between the gear running and the belt running, a control of appropriately switching the two-wheel driving and the four-wheel driving of the four-wheel drive vehicle 10, etc.

As shown in FIG. 4, the electronic control device 100 is supplied with various input signals detected by sensors disposed in the four-wheel drive vehicle 10. For example, the signals input to the electronic control device 100 include: a signal indicative of an accelerator opening degree θacc (%) detected by an accelerator opening degree sensor 112; a signal indicative of the vehicle speed V (km/h) detected by a vehicle speed sensor 114; a signal indicative of the primary rotation speed Nin (rpm) that is a rotation speed of the primary pulley 104 of the belt-type continuously variable transmission 20 detected by a primary rotation speed sensor 116; a signal indicative of the secondary rotation speed Nout (rpm) that is a rotation speed of the secondary pulley 98 of the belt-type continuously variable transmission 20 detected by a secondary rotation speed sensor 118; a signal indicative of rotation speeds Wfl, Wfr, Wrl, Wrr (rpm) of the front wheels 14L, 14R and the rear wheels 16L, 16R detected by a wheel speed sensor 120; a signal indicative of a position of the first movable sleeve 46, i.e., the first meshing position and the first non-meshing position of the first movable sleeve 46, detected by a first position sensor 122; and a signal indicative of a position of the second movable sleeve 60, i.e., the second meshing position and the second non-meshing position of the second movable sleeve 60, detected by a second position sensor 124.

Various output signals are supplied from the electronic control device 100 to devices disposed in the four-wheel drive vehicle 10. For example, the electronic control device 100 supplies to the portions the first drive current $I_1$ supplied to the first sleeve drive device 50 disposed in the first actuator 48 for engaging or releasing the first meshing clutch 26, the second drive current $I_2$ supplied to the second sleeve drive device 64 disposed in the second actuator 62 for engaging or releasing the second meshing clutch 34, a hydraulic control command signal Scvt for hydraulic control related to a shift of the belt-type continuously variable transmission 20, a hydraulic control command signal Sswt to the forward clutch Ca, the reverse brake B, the belt running clutch Cb, and the meshing clutch D related to the switching of the power transmission path between the turbine shaft 68 and the output shaft 74 in the power transmission device 18, etc. The hydraulic control command signal Scvt includes, for example, a primary instruction pressure Pintgt for driving a linear solenoid valve not shown for regulating a primary pressure Pin supplied to the primary-side hydraulic actuator 104c and a secondary instruction pressure Pouttgt for driving a linear solenoid valve not shown for regulating a secondary pressure Pout supplied to the secondary-side hydraulic actuator 98c, and these instruction pressures are output to a hydraulic control circuit 126. The hydraulic control command signal Sswt includes, for example, a command signal for driving linear solenoid valves controlling hydraulic pressures supplied to the forward clutch Ca, the reverse brake B, the belt running clutch Cb, and the meshing clutch D, and these command signals are output to the hydraulic control circuit 126.

As shown in FIG. 4, a running switching control portion 130 provides a running switching control of switching the power transmission device 18 according to a running state of the vehicle 10 between the belt running performed by selecting the first transmission path in which the drive power of the engine 12 input to the turbine shaft 68 is transmitted to the output shall 74 via the belt-type continuously variable transmission 20, and the gear running performed by selecting the second transmission path in which the drive power of the engine 12 input to the turbine shaft 68 is transmitted to the output shaft 74 via the gear transmission mechanism 72.

For example, when a running region of the vehicle 10 switches from a preset gear running region to a preset belt running region due to an increase in the vehicle speed V etc. during the gear running, the running switching control portion 130 outputs the hydraulic control command signal Sswt to the hydraulic control circuit 126 to engage the belt running clutch Cb and release the forward clutch Ca, the reverse brake B, and the meshing clutch D. For example, when the running region of the vehicle 10 switches from the belt running region to the gear running region due to a decrease in the vehicle speed V etc. during the belt running, the running switching control portion 130 outputs the hydraulic control command signal Sswt to the hydraulic control circuit 126 to engage the forward clutch Ca and the meshing clutch D and release the belt running clutch Cb and the reverse brake B.

A running determining portion 130a functionally included in the running switching control portion 130 determines during running of the vehicle 10 whether the belt running is being performed with the first transmission path selected or the gear running is being performed with the second transmission path selected. For example, the running determining portion 130a determines that the belt running is being performed if the belt running clutch Cb is engaged while the forward clutch Ca, the reverse brake B, and the meshing clutch D are released, and determines that the gear running is being performed if the forward clutch Ca and the meshing clutch D are engaged while the belt running clutch Cb and the reverse brake B are released.

When the four-wheel drive mode is selected by the electronic control device 100, a 4WD switching control portion 132 supplies the first sleeve drive device 50 and the second sleeve drive device 64 with the first drive current $I_1$ and the second drive current $I_2$, respectively, such that the first meshing clutch 26 and the second meshing clutch 34 are respectively engaged, i.e., the first movable sleeve 46 of the first meshing clutch 26 moves to the first meshing position while the second movable sleeve 60 of the second meshing clutch 34 moves to the second meshing position. For example, when the four-wheel drive mode is selected by the electronic control device 100, the 4WD switching control portion 132 supplies the first sleeve drive device 50 and the second sleeve drive device 64 with the first drive current $I_1$ and the second drive current $I_2$, respectively, such that the first meshing clutch 26 is engaged after the second meshing clutch 34 is engaged, i.e., the first movable sleeve 46 of the first meshing clutch 26 is moved to the first meshing position after the second movable sleeve 60 is moved to the second meshing position. When the two-wheel drive mode is selected by the electronic control device 100, the 4WD switching control portion 132 supplies the first sleeve drive device 50 and the second sleeve drive device 64 with the first drive current $I_1$ and the second drive current $I_2$, respectively, such that the first meshing clutch 26 and the second meshing clutch 34 are respectively released, i.e., the first movable sleeve 46 of the first meshing clutch 26 is moved to the first on-meshing position and the second movable sleeve 60 of the second meshing clutch 34 is moved to the second non-meshing position.

A 4WD switching determining portion 132a functionally included in the 4WD switching control portion 132 determines whether the two-wheel drive mode is switched to the four-wheel drive mode by the electronic control device 100. For example, if the front wheels 14L, 14R slip during running of the vehicle 10, and the slip makes a wheel speed difference Wsav (rpm) larger than a predefined first wheel speed difference W1 (rpm) between an average wheel speed Wfav (rpm) of the pair of the left and right front wheels 14L, 14R and an average wheel speed Wrav (rpm) of the pair of the left and right rear wheels 16L, 16R, the 4WD switching determining portion 132a determines that the two-wheel drive mode is switched to the four-wheel drive mode by the electronic control device 100. For example, when the wheel speed difference Wsav (rpm) becomes larger than the predefined first wheel speed difference W1 (rpm), the electronic control device 100 switches the two-wheel drive mode to the four-wheel drive mode. The average wheel speed Wfav (rpm) is the average ((Wfl+Wfr)/2) of the rotation speed Wfl (rpm) of the front wheel 14L and the rotation speed Wfr (rpm) of the front wheel 14R, while the average wheel speed Wrav (rpm) is the average ((Wrl+Wrr)/2) of the rotation speed Wrl (rpm) of the rear wheel 16L and the rotation speed Wrr (rpm) of the rear wheel 16R, and the wheel speed difference Wsav (rpm) is a difference (Wfav−Wrav) between the average wheel speed Wfav (rpm) and the average wheel speed Wrav (rpm). The first wheel speed difference W1 is a preset threshold value for wheel speed difference Wsav and defined such that slip in the front wheels 14L, 14R occurs during running of the vehicle 10 by the two-wheel driving, for example.

A 4WD control status determining portion 134 determines a 4WD control status indicative of a state of 4WD control in the four-wheel drive vehicle 10, i.e., whether the vehicle 10 is in the "disconnected state" in which the propeller shaft 30 is disconnected from the left and right front wheels 14L, 14R and the left and right rear wheels 16L, 16R in the four-wheel drive vehicle 10 so that the 4WD control is not provided, the "connected state" in which the propeller shaft 30 is connected to each of the left and right front wheels 14L, 14R and the left and right rear wheels 16L, 16R in the four-wheel drive vehicle 10 so that the 4WD control is provided, or "under transition to the connected state" in which the vehicle 10 is in the process of transition from the "disconnected state" is transitioning to the "connected state". For example, if it is determined that the first meshing clutch 26 and the second meshing clutch 34 are respectively released, i.e., the first position sensor 122 and the second position sensor 124 determine that the first movable sleeve 46 of the first meshing clutch 26 is moved to the first non-meshing position and the second movable sleeve 60 of the second meshing clutch 34 is moved to the second non-meshing position, respectively, the 4WD control status determining portion 134 determines that the 4WD control status is the "disconnected state". For example, if it is determined that the first meshing clutch 26 and the second meshing clutch 34 are respectively engaged, i.e., the first position sensor 122 and the second position sensor 124 determine that the first movable sleeve 46 of the first meshing clutch 26 is moved to the first meshing position and the second movable sleeve 60 of the second meshing clutch 34 is moved to the second meshing position, respectively, the 4WD control status determining portion 134 determines that the 4WD control status is the "connected state". For example, the 4WD control status determining portion 134 determines that the 4WD control status is the "under transition to the connected state" after the 4WD switching determining portion 132a determines that the two-wheel drive mode is switched to the four-wheel drive mode until the first meshing clutch 26 and the second meshing clutch 34 are respectively engaged.

A front/rear wheel speed difference determining portion 136 determines whether the wheel speed difference Wsav (rpm) is larger than a predefined second wheel speed difference (wheel speed difference) W2 (rpm). The second wheel speed difference W2 is a threshold value for the wheel speed difference Wsav (rpm) set in advance such that a rotation speed difference Ncs (rpm) between a rotation speed Nc1 (rpm) of the first clutch teeth 42b and a rotation speed Nc2 (rpm) of the second clutch teeth 44b in the first meshing clutch 26 has a predefined value A (rpm), and is larger than the first wheel speed difference W1 (rpm) described above. When the wheel speed difference Wsav (rpm) becomes larger than the second wheel speed difference W2 (rpm), the rotation speed difference Ncs (rpm) becomes larger than the value A (rpm), and when the wheel speed difference Wsav (rpm) becomes smaller than the second wheel speed difference W2 (rpm), the rotation speed difference Ncs (rpm) becomes smaller than the value A (rpm). Therefore, the front/rear wheel speed difference determining portion 136 has a function of determining whether the rotation speed difference Ncs (rpm) is larger than the predefined value A (rpm). The value A is a preset rotation speed difference Ncs (rpm) for avoiding the possibility that the transmission belt 106 slips due to an engagement shock of the first meshing clutch 26, i.e., a sudden inertia torque from the members on the side of the rear wheels 16L, 16R including the propeller shaft 30, input to the belt-type continuously variable transmission 20 when the first meshing clutch 26 is engaged in order to engage the first clutch teeth 42b and the second clutch teeth 44b each other.

A continuously variable transmission control portion 138 controls the transmission ratio γ of the belt-type continuously variable transmission 20 to achieve a target transmission ratio γ* calculated based on the accelerator opening degree θacc and the vehicle speed V, for example, and controls a belt clamping pressure so as not to cause a slip of the transmission belt 106 in the belt-type continuously variable transmission 20.

The continuously variable transmission control portion 138 functionally includes a target transmission ratio calculating portion 138a and a belt clamping pressure calculating portion 138b. When the running determining portion 130a determines that the belt running is being performed with the first transmission path selected, the target transmission ratio calculating portion 138a calculates the target transmission ratio γ* of the belt-type continuously variable transmission 20 at which an operating point of the engine 12 is on an optimum fuel consumption line. For example, when the running determining portion 130a determines that the belt running is being performed with the first transmission path selected, the target transmission ratio calculating portion 138a determines a target primary rotation speed Nin* by applying actual values of the vehicle speed V and the accelerator opening degree θacc to a relationship map defined and stored in advance in which a relation between the vehicle speed V and the target primary rotation speed Nin* of the belt-type continuously variable transmission 20 is described with using the accelerator opening degree θacc as a parameter, for example, and calculates the target transmission ratio γ* (=Nin*/Nout) based on the determined target primary rotation speed Nin* and the secondary rotation speed Nout detected by the secondary rotation speed sensor 118. When the target transmission ratio γ* of the belt-type continuously variable transmission 20 is calculated by the target transmission ratio calculating portion 138a, the continuously variable transmission control portion 138 outputs to the hydraulic control circuit 126 the primary instruction pressure Pintgt as a target primary pressure Pin* supplied to the primary-side hydraulic actuator 104c to achieve the calculated target transmission ratio γ* of the belt-type continuously variable transmission 20. When the running determining portion 130a determines that the gear running is being performed with the second transmission path selected, the target transmission ratio calculating portion 138a sets the target transmission ratio γ* of the belt-type continuously variable transmission 20 to the maximum transmission ratio γmax, for example.

When the running determining portion 130a determines that the belt running is being performed with the first transmission path selected, the belt clamping pressure calculating portion 138b calculates an optimum target belt clamping pressure causing no belt slip in the belt-type continuously variable transmission 20, i.e., a target secondary pressure Pout* supplied to the secondary-side hydraulic actuator 98c. For example, when the running determining portion 130a determines that the belt running is being performed with the first transmission path selected, the belt clamping pressure calculating portion 138b calculates the target secondary pressure Pout* suppressing the belt slip by applying actual values of the transmission ratio γ and the accelerator opening degree θacc to a relationship between the transmission ratio γ and the target secondary pressure Pout* with using the accelerator opening degree θacc as a parameter. The relationship is empirically obtained and stored in advance. When the target secondary pressure Pout* is calculated by the belt clamping pressure calculating portion 138b, the continuously variable transmission control portion 138 outputs the secondary instruction pressure Pouttgt to the hydraulic control circuit 126 to supply the calculated target secondary pressure Pout* to the secondary-side hydraulic actuator 98c.

When the running determining portion 130a determines that the belt running is being performed with the first transmission path selected; the 4WD control status determining portion 134 determines that the 4WD control status is the "transitioning to the connected state"; and the front/rear wheel speed difference determining portion 136 determines that the wheel speed difference Wsav is larger than the second wheel speed difference W2, a clamping pressure increasing portion 138c functionally included in the belt clamping pressure calculating portion 138b increases the clamping pressure on the transmission belt 106 wound around the pair of the primary pulley 104 and the secondary pulley 98 of the belt-type continuously variable transmission 20, i.e., the secondary instruction pressure Pouttgt output by the continuously variable transmission control portion 138 to the hydraulic control circuit 126, by a hydraulic-pressure raise amount (increase amount) Pup. For example, when the running determining portion 130a determines that the belt running is being performed with the first transmission path selected; the 4WD control status determining portion 134 determines that the 4WD control status is the "transitioning to the connected state"; and the front/rear wheel speed difference determining portion 136 determines that the wheel speed difference Wsav is larger than the second wheel speed difference W2, the clamping pressure increasing portion 138c calculates the hydraulic-pressure raise amount Pup based on, for example, a hydraulic-pressure raise amount calculation map shown in FIG. 5 from the actual transmission ratio γ When the 4WD control status is switched from the "disconnected state" to the "transitioning to the connected state" in the 4WD control status determining portion 134, the actual transmission ratio γ when the 4WD switching determining portion 132a determines that the two-wheel drive mode is switched to the four-Wheel drive mode, and increases the secondary instruction pressure Pouttgt output by the continuously variable transmission control portion 138 to the hydraulic control circuit 126 by the calculated hydraulic-pressure raise amount Pup. The map of FIG. 5 is set such that the hydraulic-pressure raise amount Pup becomes larger when the transmission ratio γ of the belt-type continuously variable transmission 20 is smaller.

When the running determining portion 130a determines that the gear running is being performed with the second transmission path selected, the belt clamping pressure calculating portion 138b calculates a preset first secondary pressure Pout1 as the target secondary pressure Pout*. When the belt clamping pressure calculating portion 138b calculates the first secondary pressure Pout1 as the target secondary pressure Pout*, the continuously variable transmission control portion 138 outputs the secondary instruction pressure Pouttgt to the hydraulic control circuit 126 to supply the calculated target secondary pressure Pout* to the secondary-side hydraulic actuator 98c. The first secondary pressure Pout1 is smaller than the target secondary pressure Pout* calculated by the belt clamping pressure calculating portion 138b when the running determining portion 130a determines that the belt running is being performed with the first transmission path selected, except a case when the belt cannot be moved toward a position corresponding to the maximum transmission ratio γmax due to a failure etc.

Figure 5:
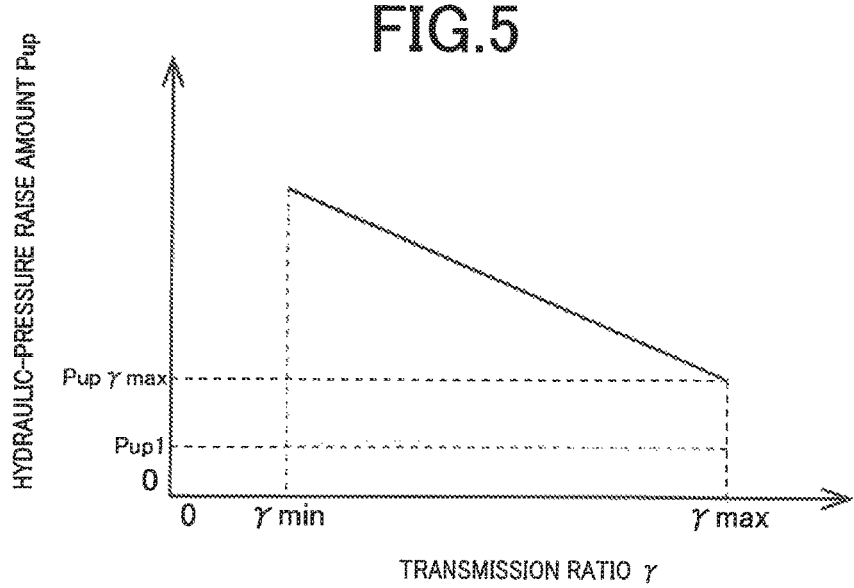
FIG. 5 is a diagram of an example of a hydraulic-pressure raise amount calculation map for calculating a hydraulic-pressure raise amount from an actual transmission ratio of the bell-type continuously variable transmission in a clamping pressure increasing portion of FIG. 4.

When the running determining portion 130a determines that the gear running is being performed with the second transmission path selected; the 4WD control status determining portion 134 determines that the 4WD control status is the "under transition to the connected state"; and the front/rear wheel speed difference determining portion 136 determines that the wheel speed difference Wsav is larger than the second wheel speed difference W2, the clamping pressure increasing portion 138c increases the secondary instruction pressure Pouttgt output by the continuously variable transmission control portion 138 to the hydraulic control circuit 126, by an amount, for example, a first hydraulic-pressure raise amount Pup1 (see FIG. 5). The amount is smaller than the hydraulic-pressure raise amount Pup in the case when the running determining portion 130a determines that the belt running is being performed with the first transmission path selected. The first hydraulic-pressure raise amount Pup1 is determined such that belt slip does not occur in the belt-type continuously variable transmission 20 even at the time of input of the engagement shock of the first meshing clutch 26, i.e., the sudden inertia torque from the members on the side of the rear wheels 16L, 16R including the propeller shaft 30 to the primary pulley 104 of the belt-type continuously variable transmission 20 via the second transmission path, when the first meshing clutch 26 is engaged to engage the first clutch teeth 42b and the second clutch teeth 44b during gear running with the second transmission path selected. As shown in FIG. 5, the first hydraulic-pressure raise amount Pup1 has a value smaller than a second hydraulic-pressure raise amount Pupγmax in the case when the transmission ratio γ of the belt-type continuously variable transmission 20 is the maximum transmission ratio γmax.

Figure 6:
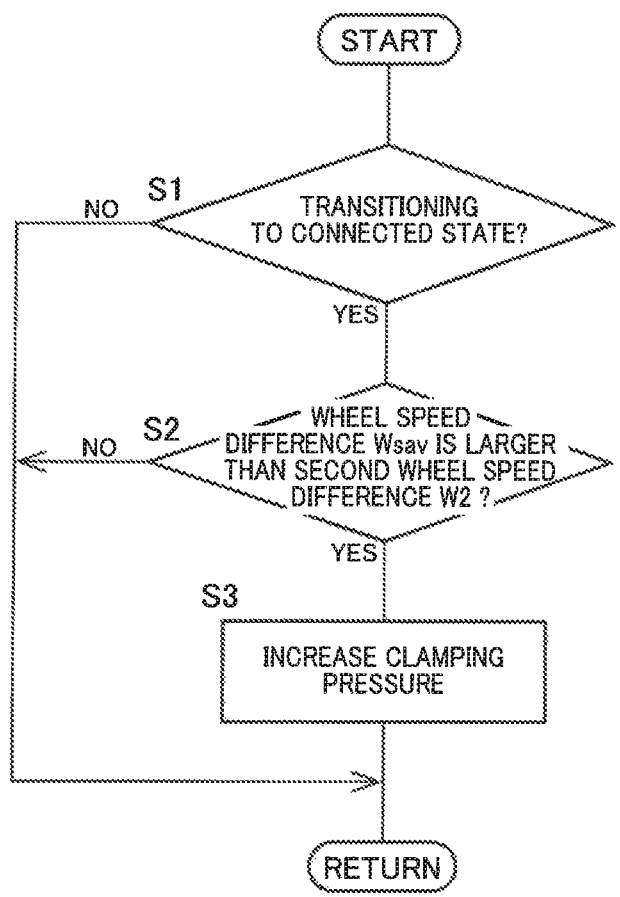
FIG. 6 is a flowchart for explaining a main portion of the control operation of an electronic control device shown in FIG. 1, i.e., a control operation for a belt clamping pressure control of the belt-type continuously variable transmission at the time of, for example, slipping of front wheels, during belt running with two-wheel driving.
Figure 7:
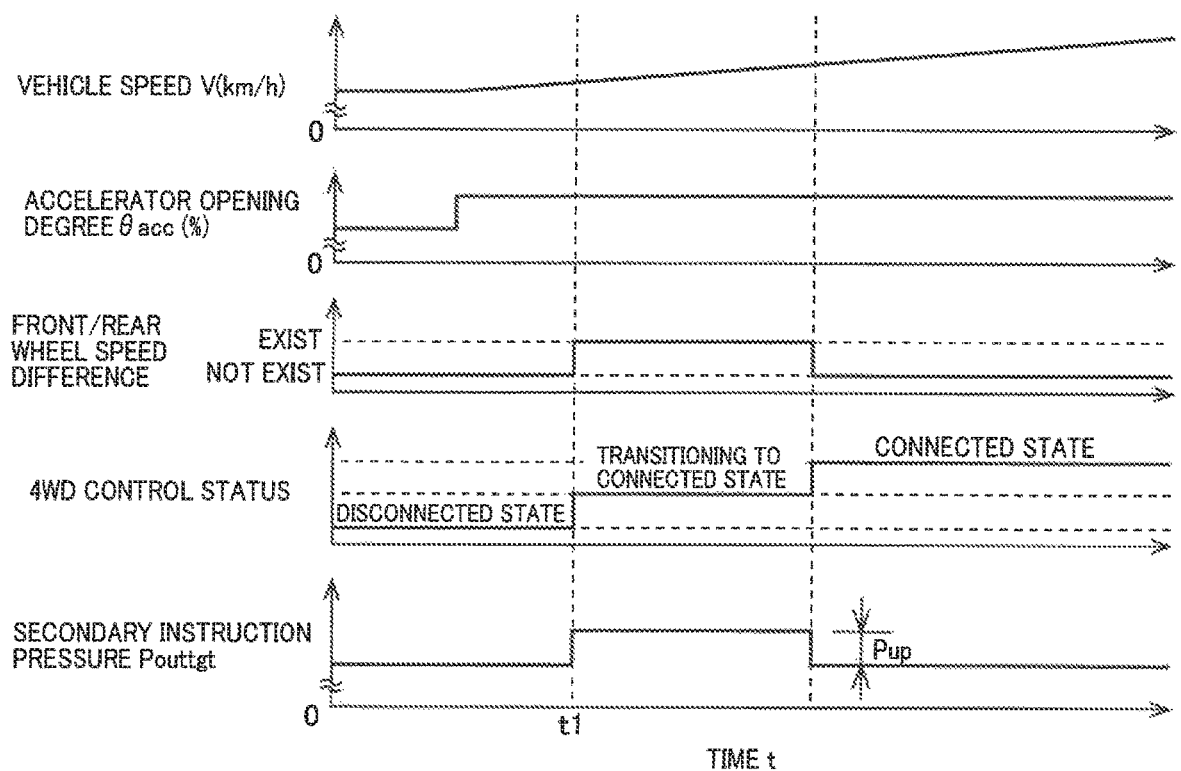
FIG. 7 is an example of a time chart when the flowchart of FIG. 6 is performed.

FIG. 6 is a flowchart for explaining a main portion of the control operation of the electronic control device 100, i.e., a control operation for the belt clamping pressure control of the belt-type continuously variable transmission 20 at the time of, for example, slipping of the front wheels 14L, 14R, during belt running with the two-wheel driving, which is repeatedly executed, for example. FIG. 7 is an example of a time chart when the flowchart of FIG. 6 is performed.

In FIG. 6, first, at step S1 (hereinafter, step will be omitted) corresponding to the functions of the 4WD switching determining portion 132a and the 4WD control status determining portion 134, it is determined whether the two-wheel drive mode is switched to the four-wheel drive mode by the electronic control device 100 so that the 4WD control status is switched from the "disconnected state" to the "transitioning to the connected state". If the determination at S1 is negative, this control routine is terminated, or if the determination at S1 is affirmative, S2 corresponding to the function of the front/rear wheel speed difference determining portion 136 is executed.

At S2, it is determined whether the Wheel speed difference Wsav is larger than the second wheel speed difference W2. If the determination at S2 is negative, i.e., if the wheel speed difference Wsav is equal to or less than the second wheel speed difference W2 and the difference between the average wheel speeds Wfav and Wrav is substantially zero, this control routine is terminated, or if the determination at S2 is affirmative, i.e., if the wheel speed difference Wsav is larger than the second wheel speed difference W2 and the difference between the average wheel speeds Wfav and Wrav exists (at t1 of FIG. 7), S3 corresponding to the functions of the continuously variable transmission control portion 138 and the clamping pressure increasing portion 138c is executed.

At S3, the secondary instruction pressure Pouttgt corresponding to the clamping pressure on the transmission belt 106 wound around the pair of the primary pulley 104 and the secondary pulley 98 of the belt-type continuously variable transmission 20 is increased by the hydraulic-pressure raise amount Pup.

In the flowchart of FIG. 6, if it is determined at S2 that the wheel speed difference Wsav is larger than the second wheel speed difference W2, the possibility of slipping of the transmission belt 106 is increased due to the engagement shock of the first meshing clutch 26, i.e., the sudden inertia torque from the members on the side of the rear wheels 16L, 16R including the propeller shaft 30, input to the belt-type continuously variable transmission 20 when the first meshing clutch 26 is engaged to engage the first clutch teeth 42b and the second clutch teeth 44b. In such a case, the secondary instruction pressure Pouttgt is increased at S3 by the hydraulic-pressure raise amount Pup, so that the clamping pressure on the transmission belt 106 is increased, and the slip of the transmission belt 106 is properly suppressed in the belt-type continuously variable transmission 20.

As described above, according to the electronic control device 100 of the power transmission device 18 of this example, when the rotation speed difference Ncs between the rotation speed Nc1 of the first clutch teeth 42b and the rotation speed Nc2 of the second clutch teeth 44b is larger than the predefined value A at the time when the first meshing clutch 26 is brought into an engaged state, the secondary instruction pressure Pouttgt, i.e., the clamping pressure on the transmission belt 106 wound around the pair of the primary pulley 104 and the secondary pulley 98 of the belt-type continuously variable transmission 20, is increased by the hydraulic-pressure raise amount Pup as compared to when the rotation speed difference Ncs is equal to or less than the predefined value A. Therefore, if the rotation speed difference Ncs is larger than the predefined value A so that the engagement shock is relatively large at the time of engagement of the first meshing clutch 26, the secondary instruction pressure Pouttgt, i.e., the clamping pressure is increased, and therefore, the belt slip can properly be suppressed even if the engagement shock at the first meshing clutch 26 is transmitted to the belt-type continuously variable transmission 20.

According to the electronic control device 100 of the power transmission device 18 of this example, whether the rotation speed difference Ncs is larger than the predefined value A is determined based on whether the wheel speed difference Wsav between the average wheel speed Wfav of the pair of the left and right front wheels 14L, 14R and the average wheel speed Wrav of the pair of the left and right rear wheels 16L, 16R is larger than the predefined second wheel speed difference W2. Therefore, from the rotation speeds Wfl, Wfr, Wrl, Wrr of the pair of the left and right front wheels 14L, 14R and the pair of the left and right rear wheels 16L, 16R, it can properly be determined that the rotation speed difference Ncs is larger than the predefined value A.

According to the electronic control device 100 of the power transmission device 18 of this example, for the secondary instruction pressure Pouttgt, i.e., the clamping pressure on the transmission belt 106, increased when the rotation speed difference Ncs is larger than the predefined value A, the hydraulic-pressure raise amount (increase amount) Pup is set to be larger as the transmission ratio γ of the belt-type continuously variable transmission 20 becomes smaller at the time of switching the power transmission device 18 from the two-wheel drive mode to the four-wheel drive mode. Therefore, if the transmission ratio γ of the belt-type continuously variable transmission 20 is relatively small so that the tension of the transmission belt 106 becomes small with respect to the secondary instruction pressure Pouttgt as compared to when the transmission ratio γ of the belt-type continuously variable transmission 20 is relatively large, the hydraulic-pressure raise amount Pup for the secondary instruction pressure Pouttgt is set to be large as compared to when the transmission ratio γ of the belt-type continuously variable transmission 20 is relatively large. Therefore, the belt slip of the belt-type continuously variable transmission 20 can properly be suppressed by the necessary and sufficient hydraulic-pressure raise amount Pup for the secondary instruction pressure Pouttgt.

According to the electronic control device 100 of the power transmission device 18 of this example, (a) the belt-type continuously variable transmission 20 is disposed in the power transmission path between the turbine shaft 68 to which the drive power output from the engine 12 is transmitted and the output shaft 74 outputting the drive power to the pair of the right and left front wheels 14L, 14R; (b) the power transmission device 18 includes the gear transmission mechanism 72 disposed in the power transmission path between the turbine shaft 68 and the output shaft 74 and parallel to the belt-type continuously variable transmission 20 and (c) the clutch mechanism 76 alternatively switching the first transmission path transmitting the drive power to the turbine shaft 68 via the belt-type continuously variable transmission 20 to the output shaft 74 and the second transmission path transmitting the drive power to the turbine shaft 68 via the gear transmission mechanism 72 to the output shaft 74; and (d) if the first transmission path is selected by the clutch mechanism 76 and the rotation speed difference Ncs in the first meshing clutch 26 is larger than the predefined value A, the secondary instruction pressure Pouttgt is increased by the hydraulic-pressure raise amount Pup. Therefore, even in the power transmission device 18 in which the belt-type continuously variable transmission 20 and the gear transmission mechanism 72 are disposed parallel to each other in the power transmission path between the turbine shaft 68 and the output shaft 74, the belt slip of the belt-type continuously variable transmission 20 can properly be suppressed.

According to the electronic control device 100 of the power transmission device 18 of this example, if the second transmission path is selected by the clutch mechanism 76 and the rotation speed difference Ncs in the first meshing clutch 26 is larger than the predefined value A, the secondary instruction pressure Pouttgt is increased by the first hydraulic-pressure raise amount Pup1 that is smaller as compared to when the first transmission path is selected. Therefore, when the second transmission path is selected by the clutch mechanism 76, the belt slip of the belt-type continuously variable transmission 20 can properly be suppressed even when the engagement shock at the first meshing clutch 26 is transmitted via the second transmission path to the primary pulley 104 of the belt-type continuously variable transmission 20.

According to the electronic control device 100 of the power transmission device 18 of this example, (a) the propeller shaft 30 and the second meshing clutch 34 are arranged in series between the first meshing clutch 26 and the rear wheels 16L, 16R in the power transmission path transmitting a portion of the drive power of the engine 12 to the pair of the left and right rear wheels 16L, 16R; (b) both the first meshing clutch 26 and the second meshing clutch 34 are released in the two-wheel driving; and (c) in the case of switching from the two-wheel driving to the four-wheel driving, the first meshing clutch 26 is engaged after the second meshing clutch 34 is engaged. Therefore, even if the engagement shock of the first meshing clutch 26, i.e., the sudden inertia torque from the members on the side of the rear wheels 16L, 16R including the propeller shaft 30, is input to the belt-type continuously variable transmission 20, the belt slip of the belt-type continuously variable transmission 20 can properly be suppressed.

Another example of the present invention will be described. The portions common to the first example described above are denoted by the same reference numerals and will not be described.

Second Example

Figure 8:
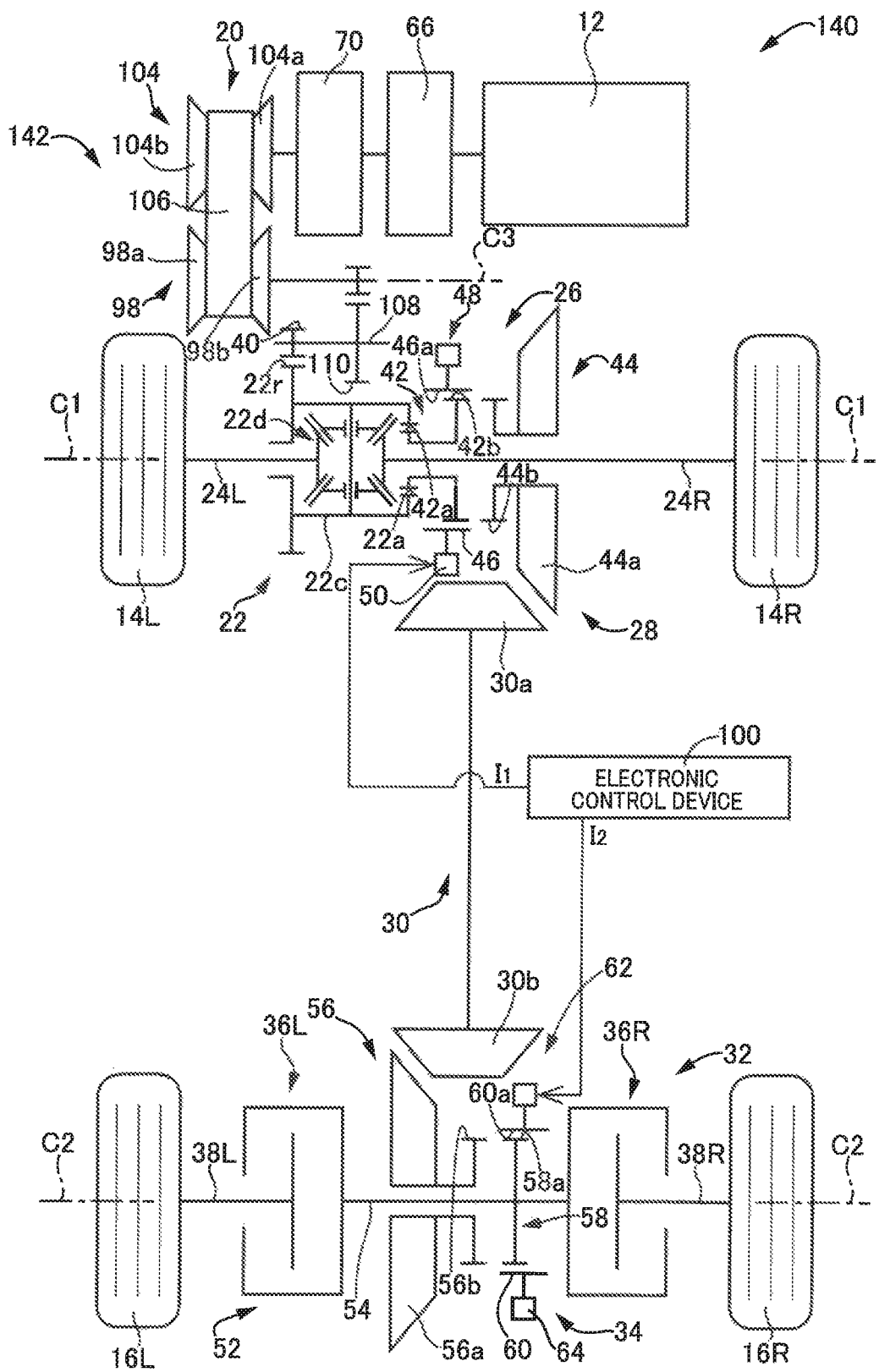
FIG. 8 is a skeleton diagram for schematically explaining a configuration of a four-wheel drive vehicle, i.e., a vehicle power transmission device, to which another example of the present invention is applied.

FIG. 8 is a diagram for explaining a power transmission device (vehicle power transmission device) 142 of a four-wheel drive vehicle 140 according to another example of the present invention. The power transmission device 142 of this example is substantially the same as the power transmission device 18 of the first example except that the gear transmission mechanism 72 is not disposed in the power transmission path between the turbine shaft 68 and the output shaft 74.

Although the examples of the present invention have been described in detail with reference to the drawings, the present invention is also applied in other forms.

For example, although the first meshing clutch 26 and the second meshing clutch 34 are included in the power transmission devices 18, 142 in the examples described above, the second meshing clutch 34 may not necessarily be included in the power transmission devices 18, 142, and the two-wheel driving and the tour-wheel driving may be switched by engaging or releasing the first meshing clutch 26.

In the first example, the front/rear wheel speed difference determining portion 136 determines whether the rotation speed difference Ncs is larger than the predefined value A from the rotation speeds Wfl, Wfr, Wrl, Wrr of the front wheels 14L, 14R and the rear wheels 16L, 16R detected from the wheel speed sensor 120; however, for example, it may be determined from a rotation speed sensor directly detecting the rotation speed Nc1 of the first clutch teeth 42b and the rotation speed Nc2 of the second clutch teeth 44b whether the rotation speed difference Ncs is larger than the predefined value A. Alternatively, it may be determined from a rotation speed detected from a rotating member other than the front wheels 14L, 14R and the rear wheels 16L, 16R whether the rotation speed difference Ncs is larger than the predefined value A.

In the first example described above, the continuously variable transmission control portion 138 increases the secondary instruction pressure Pouttgt by the hydraulic-pressure raise amount Pup when the 4WD control status determining portion 134 determines that the 4WD control status is the "transitioning to the connected state" while the front/rear wheel speed difference determining portion 136 determines that the wheel speed difference Wsav is larger than the second wheel speed difference W2; however, for example, the secondary instruction pressure Pouttgt may be increased by the hydraulic-pressure raise amount Pup When the first meshing clutch 26 is engaged, i.e., immediately before the first meshing clutch 26 is engaged.

In the first example, when the two-wheel drive mode is switched to the four-wheel drive mode, the 4WD switching control portion 132 engages the first meshing clutch 26 after engaging the second meshing clutch 34; however, for example, after the second movable sleeve 60 is moved from the second non-meshing position toward the second meshing position in the second meshing clutch 34 and, the rotation speed of the propeller shaft 30 is increased by the synchronizing mechanism, the first meshing clutch 26 may be engaged, and after the first meshing clutch 26 is engaged, the second movable sleeve 60 may be moved to the second meshing position to engage the second meshing clutch 34. Therefore, the order of engagement of the first meshing clutch 26 and the second meshing clutch 34 may appropriately be changed when the two-wheel driving is switched to the four-wheel driving.

In the first example, the clamping pressure increasing portion 138c has the hydraulic-pressure raise amount Pup set to be larger as the transmission ratio γ of the belt-type continuously variable transmission 20 becomes smaller as shown in the map of FIG. 5; however, for example, the hydraulic-pressure raise amount Pup may be set to a constant value not changing even if the transmission ratio γ of the belt-type continuously variable transmission 20 changes.

In the first example, the gear transmission mechanism 72 includes the small-diameter gear 84 and the large-diameter gear 88 and has one gear ratio; however, for example, the configuration of the gear transmission mechanism 72 may be changed such that the gear transmission mechanism 72 has two or more gear ratios.

In the first example, the engine 12 is employed as the drive power source of the four-wheel drive vehicle 10; however, the drive power source is not necessarily limited to the engine 12 and may appropriately be changed to any of those functioning as a drive power source, for example, an electric motor.

The above description is merely an embodiment and the present invention can be implemented in variously modified and improved forms based on the knowledge of those skilled in the art.

REFERENCE SIGNS LIST

12: Engine (Drive power source)
14L, 14R: Front wheels (Main drive wheels)
16L, 16R: Rear wheels (Auxiliary drive wheels)
18, 142: Power transmission device (Vehicle power transmission device)
20: Belt-type continuously variable transmission
26: First meshing clutch
30: Propeller shaft
34: Second meshing clutch
42: First rotating member (Power transmission member)
42b: First clutch teeth (Drive power source side meshing member)
44: Second rotating member (Power transmission member)
44b: Second clutch teeth (Auxiliary drive wheel side meshing member)
48: First actuator (Actuator)
68: Turbine shaft (Input shaft)
72: Gear transmission mechanism
74: Output shall
76: Clutch mechanism
98: Secondary pulley (Pulley)
100: Electronic control device (Control device)
104: Primary pulley (Pulley)
106: Transmission belt
130: Running switching control portion
130a: Running determining portion
132: 4WD switching control portion
132a: 4WD switching determining portion
136: Front/rear wheel speed difference determining portion
138: Continuously variable transmission control portion
138b: Belt clamping pressure calculating portion
138c: Clamping pressure increasing portion
A: Predefined value
Nc1, Nc2: Rotation speed
Ncs: Rotation speed difference
Pouttgt: Secondary instruction pressure (Clamping pressure)
Pup: Hydraulic-pressure raise amount (Increase amount)
Wfav: Average wheel speed of the front wheels 14L, 14R
Wrav: Average wheel speed of the rear wheels 16L, 16R
Wsav: Wheel speed difference between the average wheel speeds Wfav and Wrav
W2: Second wheel speed difference (Wheel speed difference)
γ: Transmission ratio

What is claimed is:

1. A control device of a vehicle power transmission device, the vehicle power transmission device including a belt-type continuously variable transmission having a pair of pulleys, a transmission belt wound between the pair of pulleys, and a first meshing clutch disposed in a power transmission path transmitting to a pair of auxiliary drive wheels a portion of a drive power output from a drive power source via the belt-type continuously variable transmission to a pair of main drive wheels, the control device switching a two-wheel driving and a four-wheel driving by engaging or releasing the first meshing clutch, wherein
the first meshing clutch has a drive power source side meshing member coupled to a power transmission member on the drive power source side of the power transmitting path, an auxiliary drive wheel side meshing member coupled to a power transmission member on the auxiliary drive wheel side of the power transmitting path, and an actuator engaging or releasing the drive power source side meshing member and the auxiliary drive wheel side meshing member, and wherein
when a rotation speed difference between a rotation speed of the drive power source side meshing member and a rotation speed of the auxiliary drive wheel side meshing member is larger than a predefined value at the time when the first meshing clutch is brought into an engaged state, a clamping pressure on the transmission belt is increased as compared to when the rotation speed difference is equal to or less than the predefined value.

2. The control device of a vehicle power transmission device according to claim 1, wherein
the control device determines whether the rotation speed difference is larger than the predefined value based on whether a wheel speed difference between an average wheel speed of the pair of main drive wheels and an average wheel speed of the pair of auxiliary drive wheels is larger than a predefined wheel speed difference.

3. The control device of a vehicle power transmission device according to claim 1, wherein
for the clamping pressure on the transmission belt increased when the rotation speed difference is larger than the predefined value, an increase amount is set to be larger when a transmission ratio of the belt-type continuously variable transmission at the time of engagement of the first meshing clutch is small than when the transmission ratio is large.

4. The control device of a vehicle power transmission device according to claim 1, wherein
the belt-type continuously variable transmission is disposed in a power transmission path between an input shaft to which the drive power output from the drive power source is transmitted and an output shaft outputting the drive power to the pair of main drive wheels, wherein
the power transmission device includes
a gear transmission mechanism disposed in the power transmission path between the input shaft and the output shaft parallel to the belt-type continuously variable transmission and
a clutch mechanism alternatively switching between a first transmission path in which a drive power input to the input shaft is transmitted to the output shaft via the belt-type continuously variable transmission and a second transmission path in which a drive power input to the input shaft is transmitted to the output shaft via the gear transmission mechanism, and wherein
when the first transmission path is selected by the clutch mechanism and the rotation speed difference is larger than the predefined value at the time when the first meshing clutch is brought into the engaged state, the clamping pressure on the transmission belt is increased.

5. The control device of a vehicle power transmission device according to claim 4, wherein
when the second transmission path is selected by the clutch mechanism and the rotation speed difference is larger than the predefined value at the time when the first meshing clutch is brought into the engaged state, the clamping pressure on the transmission belt is increased.

6. The control device of a vehicle power transmission device according to claim 1, wherein
a propeller shaft and a second meshing clutch are arranged in series between the first meshing clutch and the auxiliary drive wheels in the power transmission path in which a portion of the drive power output from the drive power source via the belt-type continuously variable transmission for the pair of main drive wheels is transmitted to the pair of auxiliary drive wheels, wherein
both the first meshing clutch and the second meshing clutch are released in the two-Wheel driving, and wherein
in the case of switching from the two-wheel driving to the four-wheel driving, the first meshing clutch is engaged after the second meshing clutch is engaged.

\* \* \* \* \*